United States Patent [19]
Barrs

[11] Patent Number: 5,194,789
[45] Date of Patent: Mar. 16, 1993

[54] AUTOMATIC MIRROR REPOSITIONING SYSTEM DIAGNOSTICS

[75] Inventor: John A. Barrs, Clawson, Mich.

[73] Assignee: United Technologies Automotive, Inc., Dearborn, Mich.

[21] Appl. No.: 739,534

[22] Filed: Aug. 2, 1991

[51] Int. Cl.[5] .............................................. G05B 23/02
[52] U.S. Cl. .............................. 318/565; 318/568.240; 318/568.250; 318/490; 388/909; 364/267.4
[58] Field of Search ............... 318/490, 558, 560, 563, 318/565, 567, 568.1, 568.24, 568.25, 638, 652, 663; 388/909; 364/266, 267, 267.4, 550

[56] References Cited

U.S. PATENT DOCUMENTS

| | | | |
|---|---|---|---|
| 4,682,088 | 7/1987 | Sullivan | 318/568 |
| 4,929,878 | 5/1990 | Hansen | 318/560 |
| 4,940,322 | 7/1990 | Hamamoto et al. | 350/637 |

Primary Examiner—Bentsu Ro
Attorney, Agent, or Firm—Gerald L. DePardo

[57] ABSTRACT

A memory mirror system having a mirror 19, two constant speed motors 16,18 each controlling an axis of mirror movement, position feedback signals 26,28 from each motor, switch inputs 12, a diagnostic push button 40, and an electronic controller 10, is provided with a diagnostic procedure after a self-test push button 40 has been depressed by automatically driving the mirror to the center of movement when manual movement is not requested, thereby allowing system level failures, such as position feedback sensor failures, to be detected quickly by visual inspection of mirror movement as the mirror attemps to return to the origin, without altering existing memory settings or disconnecting the controller 10 from the system. When manual movement is not requested for a predetermined period of time, the diagnostic procedure is prevented from running.

10 Claims, 2 Drawing Sheets

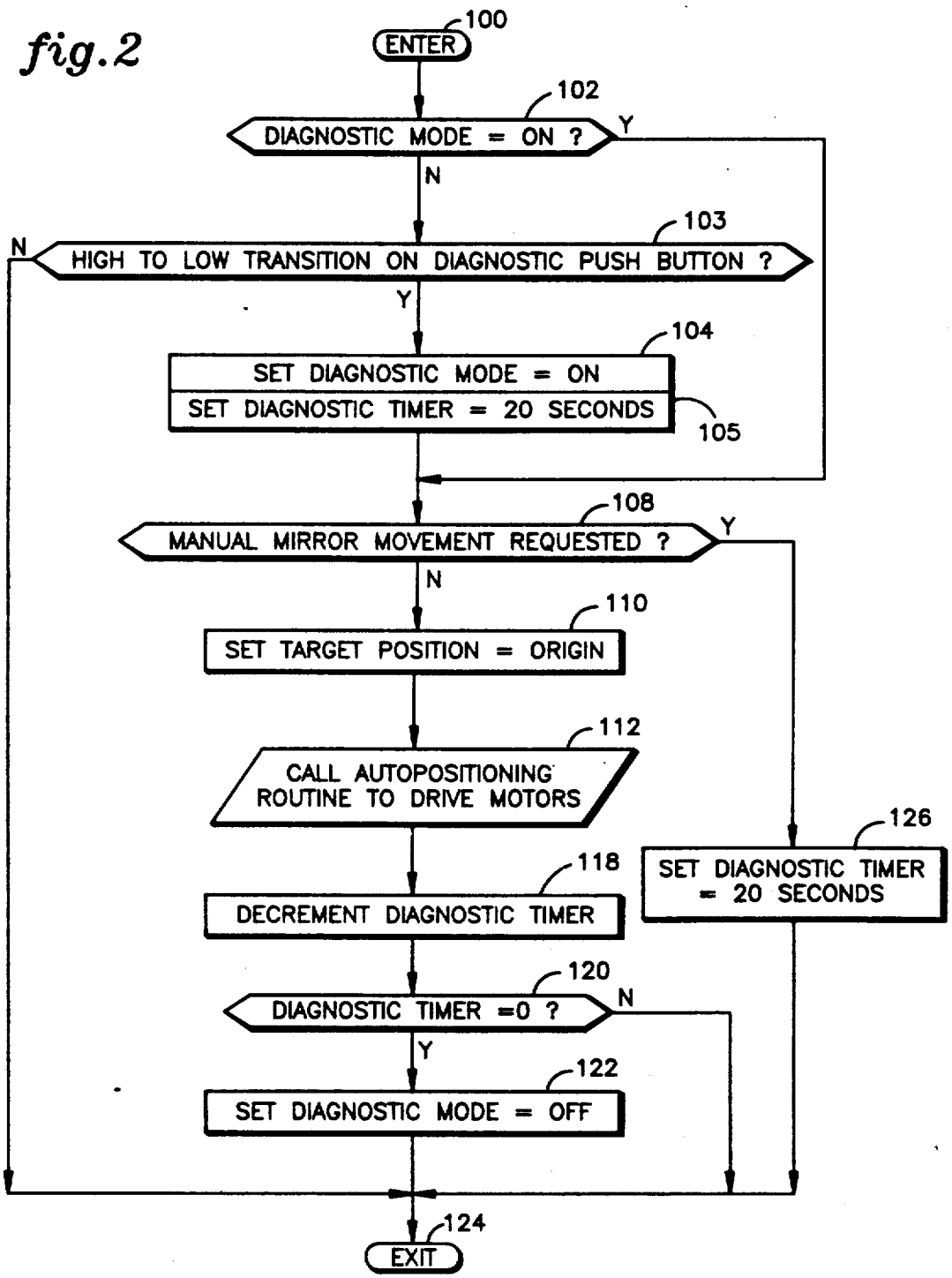

AUTOMATIC MIRROR REPOSITIONING SYSTEM DIAGNOSTICS

DESCRIPTION

1. Technical Field

This invention relates to automatic repositioning (memory) mirrors and more particularly to an improved technique for performing diagnostics on an installed memory mirror system.

2. Background Art

It has become common practice to fit certain vehicles with one or more "memory" mirrors, i.e., a mirror for which one or more desired positions are encoded (stored) in memory and then "remembered"(retrieved from memory). Memory mirrors provide automatic repositioning of a vehicle mirror when the mirror has been moved out of its desired position. For example, a first driver sets a desired position for a mirror and stores the setting, and later, a second driver changes the mirror position; when the first driver returns and initiates a switch closure, the mirror automatically returns to its original (memory) position.

Typically, memory mirror systems comprise known electronic hardware, e.g., two motors, one for up/down mirror movement about a horizontal axis and another for left/right mirror movement about a vertical axis, each motor having analog voltage position feedback, driven by an electronic controller or memory mirror module comprising: a 4-bit micro-controller with on-chip memory, motor output drivers, input interfaces, and 8-bit analog-to-digital (A/D) converters, such as that described in U.S. Pat. No. 4,929,878.

Mirror movement is typically achieved by mounting a mirror to a support shaft using a fixed position ball joint, at the center of the mirror, thereby allowing mirror movement in all directions, and pushing/pulling off-center points on the mirror using a motor connected to the mirror by a rack-and-pinion arrangement. The rack-and-pinion converts clockwise or counter-clockwise (CW/CCW) rotational motion of the motor output shaft into translational motion of a rod (or rack) using a gear mounted to the motor output shaft. The rod has notches which mesh with the gear to allow the rod to be driven thereby. For example, for left/right mirror movement, a first motor drives a first rod having one end attached to the mirror at a point along a horizontal line, a known distance to the right or left of the center of the mirror. For up/down mirror movement, a second motor drives a second rod having one end attached to the mirror at a point along a vertical line (perpendicular to the horizontal line), a known distance above or below the center of the mirror. The position of the mirror is typically described by two coordinates, one for the position of each rod. Position sensing of each rod (i.e., position feedback) is provided by a potentiometer, having a wiper shaft geared to the motor output shaft, which provides a variable voltage to the electronic controller.

The motors are typically bidirectional (CW or CCW), DC, constant speed motors, and are operated either individually or together, having equal speeds when turned ON. When a motor is turned ON it may be run either CW or CCW, which translates into left/right mirror movement by one motor and up/down mirror movement by the other motor (as described hereinbefore). Thus, the mirror has eight paths of motion: up, down, right, left, up left 45°, up right 45°, down left 45°, down right 45°.

A memory mirror system also includes an algorithm for driving the mirror from a starting position to a previously stored "memory" or target position. Examples of known algorithms with varying degrees of speed and efficiency are: the algorithm described in the aforementioned patent application, the algorithm described in copending U.S. patent application, Ser. No. 716,045, filed Jun 17, 1991, entitled "Automatic Mirror Repositioning", and the algorithm described in copending U.S. patent application Ser. No. 07/739,533, filed contemporaneously herewith, entitled "Automatic Mirror Repositioning of Mirrors Mounted Within Concave-Shaped Boundaries".

Various tests must be performed on a faulty memory mirror system to isolate the problem therein. Typically the electronic controller has software that performs a self-test procedure that tests the controller. To test the electronic controller using the self-test procedure, the electrical connectors connected to external I/O devices, i.e., switches and motors, must first be disconnected. Then, with only power applied to the module, the controller automatically performs the self-test procedure when a self-test switch is actuated.

The self-test procedure typically tests the analog-to-digital converters by reading a constant analog voltage signal provided to the position feedback analog inputs which exists when the actual feedback sensors are disconnected, it tests the discrete inputs by reading known discrete values provided on such inputs in a similar manner, and it tests the discrete output interfaces by reading discrete output wrap-arounds from the motor output drivers provided to spare discrete input ports, and verifies they are in their proper states. Thus, the self-test procedure provides comprehensive component level testing of the electronic controller.

However, the self-test procedure does not test the interfaces with other peripheral devices. For example, the self-test procedure does not test the analog feedback signals from the motor position sensors to the electronic controller, i.e., the feedback sensors or the connections thereto. Thus, if a feedback line was broken, or the A/D converter was selecting improper conversion voltages, the self-test procedure would not detect these failures, thereby requiring further checks to be performed by the technician to determine the cause of the problem. Also, when commanding the mirror manually, the system is in open-loop control and ignores the analog position feedback signals, thus, precluding detection of these faults during manual positioning as well.

One way to test the feedback signals is to initiate mirror repositioning. However, proper diagnosis of the problem requires knowledge of where the mirror will travel, i.e., the memory positions. This requires altering the existing memory mirror positions set by the customer. Furthermore, because the memory switch may also set the seat position, among other things, altering the memory position may be inconvenient for the customer.

DISCLOSURE OF THE INVENTION

Objects of the invention include provision of diagnostic capability for memory mirror systems which allows detection and isolation of hardware failures without removing the electronic controller or any electrical connectors disposed thereon, which does not disturb the existing memory settings, which requires minimal additional software, and which allows problem diagnosis using something other than the electronic controller.

According to the present invention, a diagnostic procedure provides automatic repositioning of the mirror to a predetermined position, such as the origin (i.e., the center of the mirror movement area). According further to the invention, the automatic repositioning is not provided when manual mirror positioning input signals are requesting mirror movement. According still further to the invention, the system will automatically terminate the diagnostic procedure when the manual input signals are not requesting mirror movement for a predetermined length of time. In further accord with the invention, the diagnostic procedure may be initiated by activation of a diagnostic switch.

This procedure may likely be initiated by a technician who first activates the diagnostic switch and then manually moves the mirror to a test position located away from the origin along one or both control axes. When the switch is released, automatic repositioning logic drives the mirror back to the center. The technician can determine what is wrong with a given mirror by visual inspection of the mirror movement as it attempts to return to the origin, or by other techniques. Also, terminating the procedure if no manual mirror movement is requested prevents the system from being locked in the diagnostic mode. Alternatively, the technician may first manually move the mirror to a test position located away from the origin along one or both control axes and then activate the diagnostic switch and observe mirror movement The invention represents a significant improvement over previous diagnostic techniques by allowing the technician to deduce when failures exist in the position sensors, and connections thereto, for all the mirrors connected to the system, without having to disconnect the electronic controller or perform individual tests on the I/O devices such as the position feedback sensors. Furthermore, the invention provides an absolute mirror position reference (i.e., a known calibration point), set by the controller, to aid in problem diagnosis. Still further, the invention is based on the premise that verification means other than the electronic controller is the most reliable way to test the electronic controller. Moreover, the amount of additional software required is minimal because the diagnostic procedure uses existing manual positioning and auto repositioning software. Thus, the invention provides a comprehensive test using existing software resources and minimal additional software. Furthermore, the invention allows diagnostic tests which do not alter the customer's memory mirror settings.

The foregoing and other objects, features, and advantages of the present invention will become more apparent in light of the following detailed description of exemplary embodiments thereof, as illustrated in the accompanying drawings.

BRIEF DESCRIPTION OF THE DRAWINGS

FIG. 2 is a logic flow diagram illustrating steps of diagnostic test logic in accordance with the present invention.

BEST MODE FOR CARRYING OUT THE INVENTION

Figure 1:
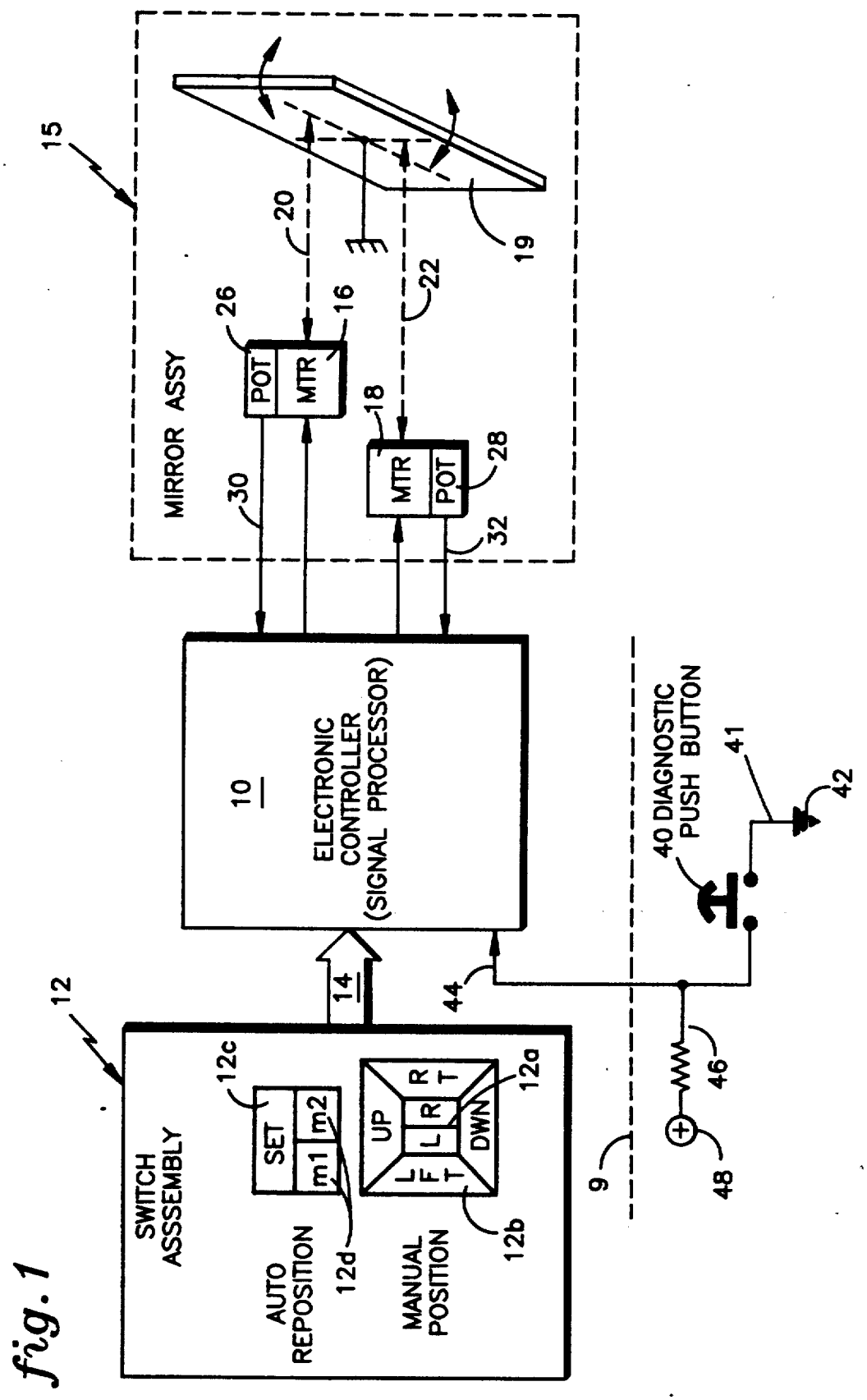
FIG. 1 is a schematic block diagram of a hardware configuration in accordance with the present invention.

Referring to FIG. 1, the hardware above the line 9 is a known prior art hardware configuration for a typical automatic mirror repositioning ("memory" mirror) system, such as that described in the aforementioned patent and typically includes an electronic controller (or signal processor) 10, comprising the aforementioned known components including a Hitachi HD404302 micro-controller driven by a 4 megahertz crystal, which accepts inputs from a switch assembly 12 on lines 14. The switch assembly 12 comprises a plurality of switches, e.g., a left/right/neutral toggle switch 12a and a joy stick or four push button switches 12b, for manual mirror positioning, and a set push button 12c and two memory push buttons 12d, for setting "memory" positions and initiating mirror repositioning. The manual mirror positioning switches 12b provide discrete signals on the lines 14 indicative of four different, selected, manual mirror movement requests. The auto-repositioning switches 12c, 12d may alternatively be located on another switch assembly at a different location from the manual positioning switches 12a, 12b on the switch assembly 12.

The signal processor 10 provides output signals to and accepts input (feedback) signals from a mirror assembly 15. The signal processor 10 typically drives two motors, 16, 18 which control a mirror 19 in a known way. For example, a first motor 18 controls left/right (horizontal) mirror movement and a second motor 16 controls up/down (vertical) mirror movement. Each motor is mechanically linked by known means 20, 22, e.g., a rack and pinion arrangement, to the mirror 19.

Each motor output shaft is geared to a position sensing device 26, 28 which provides an analog feedback voltage signal on lines 30, 32 respectively to the signal processor 10, e.g., 0 to 5 volts corresponds to min. to max mirror position for a given direction. The signal processor 10 converts each analog feedback voltage signal to a series of digital bits using an eight bit analog to digital (A/D) converter, i.e., 0 to 255 A/D counts corresponds to 0 to 5 volts from the feedback sensors. One position sensor provides a vertical position signal and the other provides a horizontal position signal. The resolution of the motor position feedback is within 1 bit of the A/D converter.

The two readings from the position sensors make up two coordinates for the position of the mirror. The position feedback A/D counts may be viewed as an orthogonal coordinate system having an x-axis and a y-axis and having as its origin (0,0), the equivalent of the A/D counts (128,128), i.e., half the scale of each motor's full range of travel. For example, if horizontal mirror movement (left/right) is considered the x-axis and vertical mirror movement (up/down) is considered the y-axis, a reading of 100 A/D counts from the horizontal motor and 200 A/D counts from the vertical motor, would correspond to coordinates of: $x = -28$, $y = 72$.

The invention includes a diagnostic push button switch 40, having one terminal connected to ground 42 by a line 41, and the other terminal connected to a line 44 which is fed to the signal processor 10. The line 44 is also connected to a positive voltage source 46, e.g., +12 volts, through a resistor 48, e.g., 100k ohms. Thus, the switch 40 provides to the signal processor 10, a signal on the line 44 indicative of the state of the switch 40, i.e., pressed or not pressed. Typically the diagnostic switch 40 is located out of sight, e.g., under the dashboard of the vehicle. Switches other than push button type and different hardware configurations may be used if desired.

Referring to FIG. 2, the diagnostic test logic is entered at an entry point 100, and a test 102 determines if a Diagnostic Mode flag is set to the ON state, i.e., is the diagnostic logic currently running. If not, a test 103 determines if a high to low transition on the diagnostic push button 40 has occurred, i.e., the diagnostic push button 40 (FIG. 1) has been depressed. If it is, a step 104 sets a Diagnostic Mode flag to the ON state and a step 105 sets a Diagnostic Timer to a predetermined time, e.g., 20 seconds. Then a test 108 determines if there is any manual mirror movement requested, i.e., if the signals from the manual switches 12b (FIG. 1) indicate a non-zero mirror movement command. If the test 102 determines that the Diagnostic Mode flag is in the ON state, the test 103 and the steps 104, 105 are bypassed and execution jumps to the test 108. If there is no manual switch activity, the result of the test 108 is NO and a step 110 sets the target position of a known auto repositioning routine (not shown) to the origin (0,0) and a step 112 calls the auto repositioning routine to drive the motors automatically to the origin. Any auto repositioning routine may be used, such as those mentioned hereinbefore. Then a step 118 decrements the Diagnostic Timer and a test 120 determines if the Diagnostic Timer is equal to zero, i.e., is it timed out. If it is, no activity was detected on the manual switch input for 20 seconds, a step 122 sets the Diagnostic Mode flag to the OFF state, and the program is exited from a point 124. Otherwise, the step 122 is bypassed because the timer has not timed out, and the routine is exited from the point 124. The Diagnostic Timer prevents the system from being indefinitely locked in the diagnostic mode by decrementing whenever there is no manual mirror movement requested. Other activity check times may be used for the Diagnostic Timer if desired.

If the test 108 determines that manual mirror movement is requested, a step 126 sets the Diagnostic Timer back to 20 seconds to allow more time to test the system, and the routine is exited from the point 124. When this path is taken, the steps 110-122 are bypassed, thereby not calling the auto repositioning logic that drives the mirror to the origin and allowing the mirror to be driven by known, periodically-running manual mirror positioning logic (not shown).

If the test 103 determines that a high to low transition has not occurred, the routine is exited from the point 124 and the steps 108-122 and 126 are bypassed, thereby precluding execution of the diagnostic test logic until another high to low transition occurs on the diagnostic push button switch 40.

Because the diagnostic procedure drives the mirror to the origin, the technician knows exactly what the mirror is supposed to do and, if it does not do it, the problem can easily be detected and isolated. For example, if the x-axis position sensor is not working properly, i.e., it is providing a constant voltage corresponding to 0 along the x-axis, and the mirror is manually positioned away from the origin solely along the x-axis, the mirror will not move at all when the manual switch is released (because the auto-repositioning routine thinks the x-axis is at the origin). Similarly, if the x-axis position sensor is always reading 0 along the x-axis and the mirror is manually positioned away from the origin along a diagonal line therefrom, i.e., motion along both axes, the mirror will move only along the y-axis until it is exactly horizontal from the center of the mirror. Thus, from a visual inspection it will be obvious that the failure is in the X-motor feedback sensor or signal connection thereto, provided the manual starting position is sufficiently far from the center.

In addition to or instead of visual inspection, the technician may measure the voltage of the feedback position signals on the lines 30, 32 to insure that it has reached the center by verifying that the voltage on each of the feedback signals is exactly half of the full range.

The diagnostic test logic is performed at a known real time update rate, e.g., 3.125 milliseconds. However, the discrete inputs may be read (by input processing logic not shown) at a rate slower than the diagnostic logic, e.g., 12.5 milliseconds. The analog inputs may be converted every 3.125 milliseconds and may be available to be read by the diagnostic test logic at the same rate. Also, for safety reasons, the diagnostic test logic may be allowed to execute only when the transmission of the vehicle is in park or neutral. Furthermore, the invention may likely be implemented in addition to or instead of the aforementioned controller self-test procedure.

Although the invention has been described as driving only one mirror, it should be understood that the invention may be used to automatically reposition as many mirrors as the hardware can support. The primary constraints are the number of motors capable of being driven, the number of inputs to the A/D converter, and the speed of the micro-controller.

Although the invention has been described as employing a specific hardware configuration for driving the mirror, i.e., a motor driving a rack-and-pinion having potentiometer feedback, any hardware configuration, having position feedback, that can both manually and automatically drive a mirror to a desired position, may be used. Also, although the movement axes are described as being orthogonal, the invention will work equally well with non-orthogonal axes because the position feedback signals, if operating properly, will always reflect the current mirror position. Similarly, instead of using the origin as the continuous repositioning location, any predetermined location that provides adequate indication of failures may be used.

Although the invention has been described and illustrated with respect to exemplary embodiments thereof, it should be understood by those skilled in the art that the foregoing and various other changes, omissions and additions may be made without departing from the spirit and the scope of the invention.

I claim:

1. A diagnostic system for an automatic mirror repositioning system, comprising:

mirror positioning drive means, responsive to mirror positioning drive signals, for driving the mirror in a direction related to said mirror positioning drive signals;

mirror position feedback means, responsive to the position of the mirror, for providing position feedback signals related to the position of the mirror;

diagnostic initiation means for selectively providing a diagnostic initiation signal; and signal processing means, responsive to said position feedback signals and said diagnostic initiation signal, for providing signals indicative of a predetermined target position of the mirror, and for providing said mirror positioning drive signals to said mirror positioning drive means to cause said position feedback signals to indicate the mirror position is equal to said predetermined target position after said diagnostic initiation signal has appeared at least once.

2. Apparatus of claim 1:
further comprising manually operable positioning means for providing manual positioning signals indicative of the desired direction of motion of the mirror; and
wherein said signal processing means comprises means for providing said mirror positioning drive signals to said mirror positioning drive means to cause said position feedback signals to indicate the mirror position is equal to said predetermined target position while said manual positioning signals are not present and after said diagnostic initiation signal has appeared at least once.

3. Apparatus of claim 1 wherein said diagnostic initiation means comprises a manually operable diagnostic switch.

4. Apparatus of claim 1 wherein said signal processing means comprises means for terminating provision of said mirror positioning drive signals to said mirror positioning drive means to cause said position feedback signals to indicate the mirror position is equal to said predetermined target position when said manual positioning signals are not present for a predetermined period of time.

5. Apparatus of claim 1 wherein said predetermined target position is substantially the center of mirror movement.

6. A method of diagnosing a failure in an automatic mirror repositioning system having a predetermined target position, comprising the steps of:
manual positioning the mirror to a test position away from said predetermined target position;
automatically repositioning the mirror to said predetermined target position when said step of manual positioning is not being performed; and
monitoring the mirror movement from said test position to said predetermined target position to determine the failure in said mirror repositioning system.

7. The method of claim 6 further comprising the step of monitoring said manual positioning of the mirror and, when said step of manual positioning is continuously not performed for a predetermined period of time, terminating said automatic repositioning of the mirror.

8. The method claim 6 wherein said step of monitoring the mirror movement comprises visual monitoring of the mirror movement 9. The method of claim 6 wherein said predetermined target position is substantially the center of mirror movement.

10. The method of claim 6 wherein said step of automatically repositioning is performed only after a diagnostic switch has been actuated.

* * * * *